July 26, 1932.  E. E. PARKER  1,869,343
BRAKE SHOE RELINER
Filed July 17, 1931  2 Sheets-Sheet 1
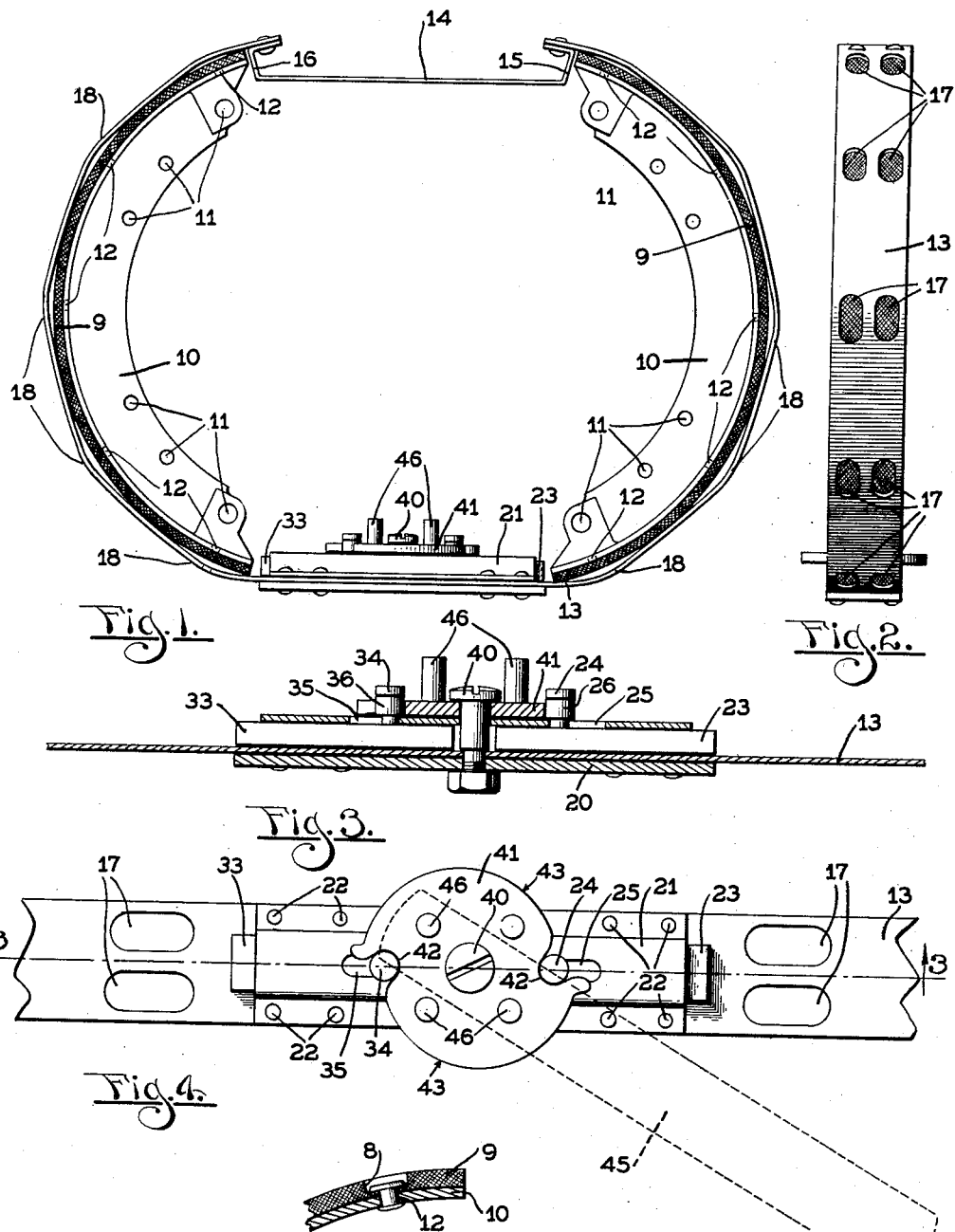

July 26, 1932.  E. E. PARKER  1,869,343
BRAKE SHOE RELINER
Filed July 17, 1931     2 Sheets-Sheet 2

Inventor
Elmer E. Parker
By Liverance and Van Antwerp
Attorneys

Patented July 26, 1932

1,869,343

UNITED STATES PATENT OFFICE

ELMER E. PARKER, OF GRAND RAPIDS, MICHIGAN

BRAKE SHOE RELINER

Application filed July 17, 1931. Serial No. 551,323.

This invention relates to a brake shoe reliner and more particularly to clamping means adapted to encircle a pair of brake shoes to thereby maintain the brake lining snugly adjacent the outer faces of the shoes whereby the same may be riveted to the shoes while held in tight relationship thereto.

In several automobiles which utilize the outwardly expanding type of brake shoes, and particularly the Model A Ford, the clearance between the outer faces of the shoes and the inner side of the drum positioned thereabout is barely sufficient to receive the brake lining therebetween and hence it is necessary when relining the brake shoes to place and hold the lining very tightly against the shoes in order that continuous friction may not be had between the inner side of the drum of the wheel and the outer surfaces of the brake linings.

The primary object of my invention is to provide a means whereby the lining may be held very tightly against the shoes and riveted thereto while being held in such position. Thus an extremely neat job of lining is had, the outer face of the lining being concentric with the inner face of the drum against which it frictionally engages when braking is had.

Another advantage resides in the polygonal shape of the encircling band, such shape causing the band to creep along the outer face of the brake lining and hence smooth out any irregularities in the brake lining and thus causing it to set evenly and tightly against the outer face of the brake shoe.

Another advantage of my invention resides in the oblong shape of the holding device whereby an anvil may be readily inserted therebetween, such being desirable during the installation of the rivets.

Still another advantage resides in the tightening means whereby the brake shoes may be quickly and easily locked in position with the brake linings against the outer faces.

Further objects, and objects pertaining to the details and economies of construction and operation of my invention will definitely appear from the detailed description to follow.

Referring to the drawing,

Fig. 1 is a plane view of the preferred form of my clamping device ready to be applied to two brake shoes with brake linings positioned thereagainst.

Fig. 2 is a side view of Fig. 1.

Fig. 3 is a cross sectional view through the cam expanding means, this view being taken along the line 3—3 of Fig. 4.

Fig. 4 is a plane view of Fig. 3, the cam disc being in a position whereby the slides are held in inoperative position, the dotted lines indicating the handle means for rotating the cam disc.

Fig. 9 is a view in cross section through the brake shoe and the brake lining.

Similar numerals refer to similar parts throughout the several views.

Figure 5:
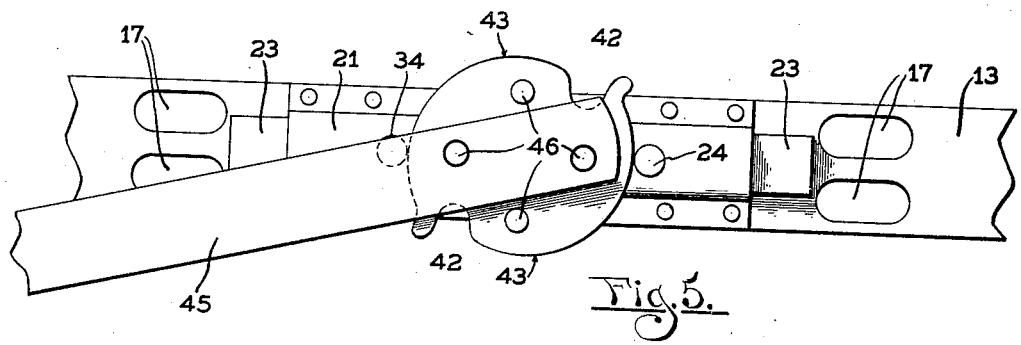
Fig. 5 is a view similar to Fig. 4 but showing the cam disc rotated whereby the slides are pushed outwardly.

Referring to the drawing, especially Fig. 1, 10 indicates the brake shoes, these being identical in construction and having the usual holes 11 therethrough. Also, as illustrated in dotted lines in Fig. 1, rivet holes 12 are formed in the outer flange of the shoes 10.

Flexible steel band 13 is bent as clearly shown in Fig. 1 and a member 14 holds the ends of the band in spaced rigid relationship as shown at the top of Fig. 1 and portions 15 and 16 serve as abutments against which the ends of the brake shoes contact.

The bar 13 has a plurality of pairs of openings 17, see Figs. 2 and 4, and during the formation of these openings by stamping, the bar 13 is slightly deformed by outwardly extending portions as indicated at 18. See Fig. 1.

Plate 20 is rigid to the outer face of the bar 13 and a channel shaped plate 21 is on the inner side of the bar, these members being held together by rivets 22. Slides 23 and 33, having pins 24 and 34 extending through slots 25 and 35, respectively, in the channel member 21, provide actuating means for the slides. Rollers 26 and 36 are mounted on the pins or projections 24 and 34 respectively.

Bolt 40 extends through the plate 20 and channel member 21 and the cam disc 41 is revolubly mounted thereon. The disc 41 has recesses 42 as shown and the cam surfaces 43 extend therefrom. The pins 24 and 34 are received in the recesses 42, see Fig. 4, when the slides 23 are in their normal position, but when the handle member 45, positioned upon the prongs 46 rigid with the disc, is rotated, the pins ride against the surfaces 43 and cause the slides 23 to be forced outwardly.

The operation of the device will now be apparent. After the several elements are positioned as shown in Fig. 1, the handle 45 is placed in position as shown in Fig. 4 and is then rotated to the position shown in Fig. 5 whereupon the slides 23 and 33 contact against the ends of the shoes and, abutting against fixed stops 15 and 16, the shoes 10 will be forced outwardly and the bar 13 will be drawn against the brake lining 9 thus maintaining it tightly in engagement with the shoes. The openings 17 are so positioned as to aline with the rivet holes 12 and hence the brake lining may be drilled from the outer side of the bar as indicated at 8, see Fig. 9, thus allowing permanent connection to be made between the brake lining and the shoes after which the clamping device may be removed.

Figure 6:
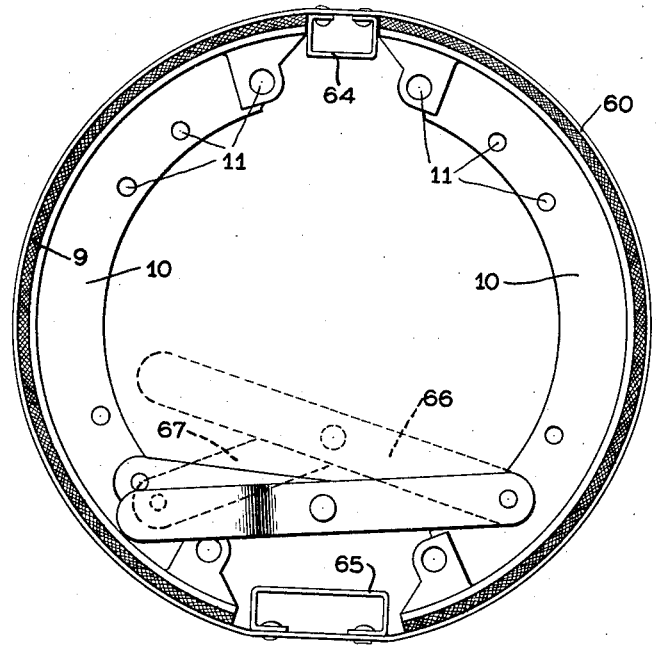
Fig. 6 is a plane view of a modified form of my invention.
Figure 7:
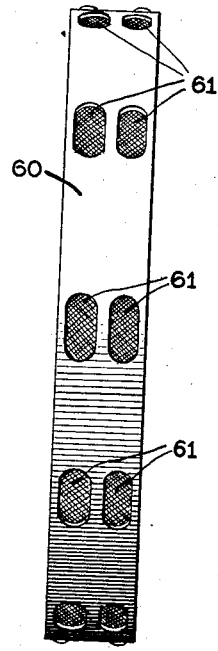
Fig. 7 is a side view of Fig. 6.
Figure 8:
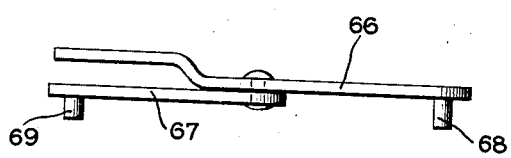
Fig. 8 illustrates the toggle handle which is used to expand the brake shoes as illustrated in Fig. 6.

Referring now to Figs. 6, 7, and 8, in which a modification is shown, 10 indicates the brake shoes, 9 the brake linings and 60 a metal bar, this bar having openings 61 serving the same purpose as the previously referred to openings 17.

An abutment member 64 is riveted to the bar 60, see Fig. 6, and a locking member 65 is positioned opposite thereto. A toggle or spreading lever consists of members 66 and 67, see Fig. 8, these members having prongs 68 and 69, respectively, and manipulation of this lever with the prongs engaging holes in the shoes 10 causes expansion and contraction of the shoes as is easily understood.

Having thus revealed this invention, I claim as new and desire to secure the following combinations and elements, or equivalents thereof, by Letters Patent of the United States.

I claim:

1. In combination, a flexible band of metal having a straight portion and curved portion at either end thereof, said curved portions being adapted to receive brake shoes therein, said brake shoes having linings at their outer faces but said lining being not fastened thereto, abutment means at the ends of the band and expanding means fastened to the straight portion of the band, said expanding means consisting of a cam disc revolubly mounted upon said straight portion and slides actuated by said cam disc, said slides engaging against the adjacent ends of the brake shoes.

2. In combination, a strip of metal having a straight portion and end portions curved substantially into semi-circular form, abutment means at either end of the strip of metal, said semi-circular portions being adapted to receive brake shoes and lining interiorly thereof, means to force the brake shoes outwardly against the said band of metal, said band having openings therethrough whereby access to the linings may be had.

3. An article of manufacture consisting of a continuous band of metal adapted to receive brake shoes interiorly thereof, an abutment on the inner side of said band against which the ends of said brake shoes are moved and means, including a cam disc and slides adjacent thereto for pressing against the outer ends of the brake shoes whereby they are brought into tight engagement with said band.

4. A device for operating upon a pair of internally expanding brake shoes having linings positioned thereagainst comprising the combination of, a flexible band extending around the outer faces of said linings, means for maintaining said brake shoes in spaced apart relation and means for forcing one end of the one brake shoe outwardly whereby the linings are brought into contact with the band, said band having a plurality of openings therethrough.

5. In a device of the character described, a continuous flexible band having openings therethrough, an abutment located interiorly of the said band and extendable means positioned directly opposite to said abutment means for the purpose described.

6. A device for relining a brake shoe or the like comprising, a metal band adapted to receive a brake shoe therein with the lining positioned on its outer face, means for holding the band in an enclosing position, means for preventing movement of the brake shoe along the band, and means for forcing the brake shoe against the metal band, said band having openings therethrough whereby access through the lining may be had.

7. In combination, a substantially circular band of flexible metal having a fixed abutment located interiorly thereof, said band having a plurality of openings therethrough and an expanding means cooperatively associated with the said band.

8. In combination, a continuous band of metal having an abutment positioned interiorly thereof, said band adapted to receive brake shoes therein and toggle lever means adapted to urge said brake shoes outwardly.

In testimony whereof I affix my signature.

ELMER E. PARKER.